Dec. 27, 1932.   O. STEINER   1,892,412
MOTION FILM CAMERA WITH SPRING MOTOR DRIVE
Filed May 29, 1931
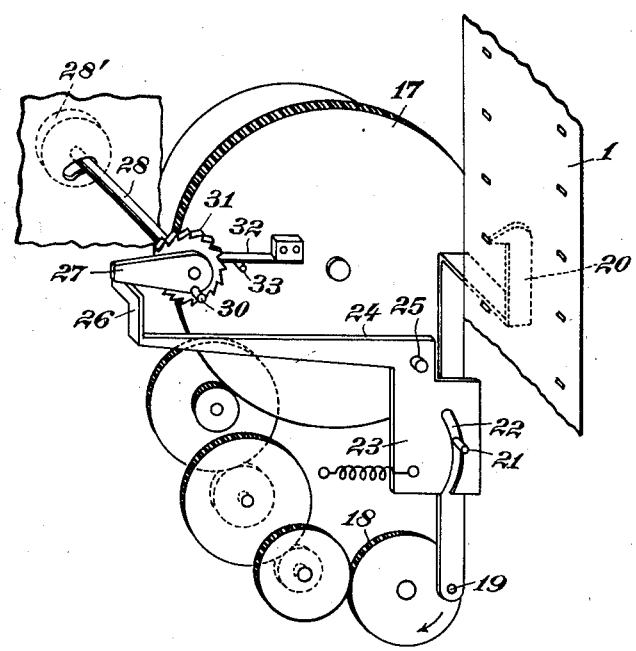
Inventor:
Otto Steiner
by Loroc Kehlenbeck
Attorneys

Patented Dec. 27, 1932

1,892,412

UNITED STATES PATENT OFFICE

OTTO STEINER, OF BERLIN-SPANDAU, GERMANY, ASSIGNOR TO SIEMENS & HALSKE, AKTIENGESELLSCHAFT, OF SIEMENSSTADT NEAR BERLIN, GERMANY, A CORPORATION OF GERMANY

MOTION FILM CAMERA WITH SPRING MOTOR DRIVE

Application filed May 29, 1931, Serial No. 540,832, and in Switzerland June 5, 1930.

My present invention relates to photographic cameras employing films driven by a spring motor. Hitherto in film cameras of this kind the spring motor is generally left in a partly wound condition at the end of the operation, and the spring is liable to suffer from being left in such condition. Constructions have been proposed for allowing the spring of the motor to be fully unwound at the end of the operation of the camera, without at the same time feeding the film, which feeding would be objectionable as it might cause the film to become light struck. Film cameras often include a counter or indicator enabling the user of the camera to ascertain which film has been exposed or which is the next film to be exposed. My present invention relates to a device which enables such a counter or indicator to be thrown out of action automatically simultaneously with the throwing of the film feeding device into inactive positon; in other words, there is an operative connection between the device which throws the feeding film means out of action and the device which throws the counter out of action. My present invention therefore enables the spring of the motor which operates the film feeding device to be allowed to run down completely without operating the film feeding device and without operating the film counter which is driven by said motor under normal conditions. I may cause the setting of the film feeding device to inactive position to effect automatically, through suitable connecting means, the simultaneous throwing out of action of the counter; or, the reverse arrangement may be adopted, that is to say, the operator may actuate a device to throw the counter out of action, and by means of suitable intermediate mechanism, such operation may be caused to simultaneously throw the film feeding device out of action. For instance, the counter may be connected with the spring motor by a clutch or by a flexible drive or a slip drive so that the positive connection between the device which throws out the film feeding means and the device which throws out the counter, can be effected by throwing out the clutch, stopping the flexible drive of one member of the slip drive or in any similar way.

In the accompanying drawing I have shown in a perspective view, a suitable embodiment of my invention, it being understood that some of the customary parts of a film camera have been omitted for the sake of clearness.

At 1 I have indicated the film which is driven by means of a spur gear 17 connected with a spring motor or clockwork indicated at S. By means of a suitable train of gears, motion is transmitted from the spur gear 17 to a pinion 18 carrying a crank pin 19 connected pivotally with the lower end of a lever or bar which at its upper end carries the gripper or claw 20 adapted to engage the perforations of the film 1 in a manner well known in the art. Said bar is provided with a pin 21 movable in a curved slit 22 of the arm 23 of a spring pressed lever fulcrumed at 25. The other arm 24 of this lever has a lateral bend 26 at its end and lies in the path of a lever arm 27 secured rigidly to a shaft 28. The shaft 28 extends to the outside of the camera through a slot 29 in one of the camera walls, and at its outer end said shaft carries a knob indicated at 28'. By means of said knob the shaft 28 may be shifted, in such a way as to remain parallel to itself, about a stationary fulcrum indicated at 30, it being understood that the slot 29 has its center on the axis of said fulcrum. If the shaft 28 is shifted in the direction indicated by the arrow, it will cause the lever arm 27 to move downwardly and to impart a like motion to the arm 24 of the elbow lever 23, 24. By the motion of the lever arm 23, the bar carrying the gripper or claw 30 will be moved away from the film so that such claw while continuing to move up and down, owing to its connection with the crank pin 19, will not engage the film, the latter therefore remaining stationary. By thus moving the shaft 28 out of its normal position shown in the drawing, I am enabled to permit the spring motor to run down without feeding the film.

The shaft 28 constitutes a drive shaft for a counter of the character above referred to, such counter not being illustrated, since it may be of any well known or approved character. On the shaft 28 is secured rigidly a ratchet wheel 31, and the spur gear 17 carries a leaf spring 32 which during the rotation of said spur gear under the influence of the spring motor, feeds the ratchet wheel 31 the distance of one tooth for each complete revolution of the spur gear 17. A pin 33 carried by the spur gear 17 prevents the leaf spring 32 from yielding at the time that the ratchet wheel 31 is turned the distance of one tooth as just referred to. The leaf spring 32 is, however, free to yield in the opposite direction, so as to oppose no resistance, and not to effect any feed of the ratchet wheel 31, when the spur gear 17 is turned in the opposite direction, as it is when winding the spring of the motor. Therefore, when winding the spring, the position of the film counter will not be affected. The drawing shows a radial arrangement for the spring 32, but if desired such spring might be tangential to the ratchet 31, in which case the pin 33 might be dispensed with. When the shaft 28 is swung about the fulcrum 30, the ratchet wheel 31 is carried away from the leaf spring 32 so that if the spring motor is then allowed to run down, the leaf spring 32 will not come in contact with the ratchet 31 during the rotation of the spur gear 17 and therefore swinging of the shaft 28 to the inactive position above referred to, will throw the film counter out of action and will also, as explained above, throw the film feeding device out of action.

With certain film counters of different construction, the throwing of the device out of action may be effected by having a pawl feed a ratchet for the film counter, said pawl being controlled from the drive by lugs or pins and by connecting such pawl operatively with a lever serving to throw the film feeding device out of action. In this case the pawl is preferably arranged in such a manner that it may be lifted rearwardly from the driving ratchet 31 by means of the fastening knob of the throw-out device, and also arranged in such a manner that it will simultaneously rock the lever 24 connected therewith operatively so that the guide 22 will be shifted to carry the gripper or claw 20 out of contact with the perforations of the film. Lifting the driving pawl of the ratchet 31 can be accomplished by journalling said pawl by means of an elongated opening upon a stationary pin or fulcrum and bringing such pawl by means of a spring, into position for driving the ratchet 31; studs or projections revolving together with the drive, for instance with the spur gear 17, would cause the pawl to be rocked on its fulcrum in such a direction as to make it feed the ratchet wheel, whereas when winding the spring, the said studs would engage the pawl in such a manner that it will be unable to turn the ratchet wheel 31.

This modification and others may be made without departing from the nature of my invention as defined in the appended claims.

I claim:

1. A film camera with spring motor drive, having a film-feeding mechanism normally operated by said motor drive, means for rendering the film-feeding mechanism inoperative to feed the film during continued operation of the spring motor drive, a film counter normally operated by said motor drive, and means for throwing the film counter out of action automatically whenever said first-mentioned means is operated to render the film-feeding mechanism inoperative to feed the film, while the spring motor drive continues to operate.

2. A film camera with spring motor drive, having a film-feeding mechanism normally operated by said motor drive, means for rendering the film-feeding mechanism inoperative to feed the film during continued operation of the spring motor drive, a film counter likewise normally operated by said motor drive, means for interrupting the driving connection between the motor and the counter, and an operative connection from the counter to the said first-mentioned means, automatically to render the film-feeding mechanism inoperative to feed the film whenever the counter is disconnected from the motor drive.

3. A film camera with spring motor drive, having a film-feeding mechanism normally operated by said motor drive, means for rendering the film-feeding mechanism inoperative to feed the film during continued operation of the spring motor drive, a film counter likewise normally operated by said motor drive, and an operative connection between the counter and the said means, to cause the throwing of the counter out of action to occur simultaneously with the rendering of the film-feeding mechanism inoperative to feed the film, while the spring motor drive continues to operate.

4. A film camera according to claim 3, in which the counter is provided with a wheel movable into and out of engagement with the spring motor drive.

5. A film camera according to claim 3, in which the counter is provided with a wheel mounted to rock bodily to bring it into or out of engagement with the spring motor drive.

6. A film camera according to claim 3, in which the counter is provided with a wheel mounted to rock bodily about a stationary axis parallel to the axis of said wheel, to bring said wheel into or out of engagement with the spring motor drive.

7. A film camera according to claim 3, in which the film-feeding mechanism includes a claw adapted normally to engage the perforations of the film, and in which the operative connection includes means to shift said claw to a position inoperative to feed the film, simultaneously with the throwing of the counter out of connection with the spring motor drive.

8. A film camera according to claim 3, in which the counter is provided with a wheel mounted to rock bodily to bring it into or out of engagement with the spring motor drive, and in which the film-feeding mechanism includes a claw adapted normally to engage the perforations of the film, and in which the operative connection includes means to shift said claw to a position inoperative to feed the film, simultaneously with the throwing of the counter out of connection with the spring motor drive.

In testimony whereof I affix my signature.

OTTO STEINER.